(12) United States Patent
Ryan et al.

(10) Patent No.: US 8,341,532 B2
(45) Date of Patent: Dec. 25, 2012

(54) AUTOMATED SET-UP OF A COLLABORATIVE WORKSPACE

(75) Inventors: Patricia A. Ryan, Seattle, WA (US);
Suri Raman, Mercer Island, WA (US);
Ulrike A. Anders, Chicago, IL (US);
Jason D. Giles, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 12/136,076

(22) Filed: Jun. 10, 2008

(65) Prior Publication Data
US 2009/0307605 A1   Dec. 10, 2009

(51) Int. Cl.
*G06F 3/00* (2006.01)
(52) U.S. Cl. .......................... 715/751; 715/752
(58) Field of Classification Search ............ 715/225, 715/741, 751, 752, 762; 719/320
See application file for complete search history.

(56) References Cited

U.S. PATENT DOCUMENTS

| | | | |
|---|---|---|---|
| 5,008,853 A | 4/1991 | Bly et al. | |
| 5,107,443 A | 4/1992 | Smith et al. | |
| 5,375,200 A * | 12/1994 | Dugan et al. | 715/804 |
| 5,533,183 A | 7/1996 | Henderson et al. | |
| 6,233,600 B1 | 5/2001 | Salas et al. | |
| 6,262,735 B1 * | 7/2001 | Etelapera | 715/854 |
| 6,289,460 B1 | 9/2001 | Hajmiragha | |
| 6,360,252 B1 * | 3/2002 | Rudy et al. | 709/206 |
| 6,564,246 B1 | 5/2003 | Varma et al. | |
| 6,629,129 B1 | 9/2003 | Bookspan et al. | |
| 6,744,447 B2 | 6/2004 | Estrada et al. | |
| 7,233,951 B1 | 6/2007 | Gainer et al. | |
| 7,249,314 B2 | 7/2007 | Walker et al. | |
| 7,386,797 B1 * | 6/2008 | Chatterjee et al. | 715/751 |
| 7,496,841 B2 * | 2/2009 | Hadfield et al. | 715/255 |
| 7,546,571 B2 | 6/2009 | Mankin et al. | |
| 7,609,257 B2 | 10/2009 | Wright et al. | |
| 7,702,730 B2 * | 4/2010 | Spataro et al. | 709/205 |
| 7,707,249 B2 * | 4/2010 | Spataro et al. | 709/205 |
| 7,734,690 B2 * | 6/2010 | Moromisato et al. | 709/204 |
| 7,774,703 B2 * | 8/2010 | Junuzovic et al. | 715/246 |
| 7,933,952 B2 | 4/2011 | Parker et al. | |
| 2002/0147611 A1 * | 10/2002 | Greene et al. | 705/1 |
| 2002/0198734 A1 * | 12/2002 | Greene et al. | 705/1 |
| 2003/0004744 A1 * | 1/2003 | Greene et al. | 705/1 |
| 2003/0046134 A1 * | 3/2003 | Frolick et al. | 705/8 |
| 2003/0065722 A1 | 4/2003 | Van Ieperen | |
| 2003/0135565 A1 * | 7/2003 | Estrada | 709/206 |

(Continued)

FOREIGN PATENT DOCUMENTS

KR   2003-0093871 A1   12/2003

OTHER PUBLICATIONS

"Microsoft Office SharePoint Server 2007 Meeting Workspaces," 2007, http://planning.ucsc.edu/IT/productivity/EPE%20Docs/SharePointMeetingWorkspaces_GS_E.ppt.*

(Continued)

*Primary Examiner* — Ryan Pitaro
*Assistant Examiner* — Ryan Barrett

(57) ABSTRACT

An approach to setting up a collabortive workspace involves receiving a user's instructions to convert an object to a collaborative workspace. In response to this instruction, the approach creates the collaborative workspace in a substantially automated manner. The approach may thereby facilitate the provisioning of a collaborative workspace, eliminating or at least reducing the manual effort involved in setting up a collaborative workspace.

16 Claims, 10 Drawing Sheets

U.S. PATENT DOCUMENTS

| | | | |
|---|---|---|---|
| 2004/0088647 A1 | 5/2004 | Miller et al. | |
| 2004/0128150 A1 | 7/2004 | Lundegren | |
| 2004/0215721 A1* | 10/2004 | Szeto et al. | 709/204 |
| 2004/0216039 A1* | 10/2004 | Lane et al. | 715/511 |
| 2005/0010640 A1 | 1/2005 | Cannata et al. | |
| 2005/0097440 A1 | 5/2005 | Lusk et al. | |
| 2005/0114475 A1 | 5/2005 | Chang et al. | |
| 2005/0138566 A1 | 6/2005 | Muller et al. | |
| 2005/0160145 A1 | 7/2005 | Gruen et al. | |
| 2005/0216556 A1 | 9/2005 | Manion et al. | |
| 2006/0010165 A1* | 1/2006 | Gee | 707/104.1 |
| 2006/0026502 A1 | 2/2006 | Dutta | |
| 2006/0036692 A1 | 2/2006 | Morinigo et al. | |
| 2006/0080432 A1 | 4/2006 | Spataro et al. | |
| 2006/0101368 A1 | 5/2006 | Kesarwani et al. | |
| 2006/0123347 A1 | 6/2006 | Hewitt et al. | |
| 2006/0230115 A1* | 10/2006 | Brooke et al. | 709/206 |
| 2007/0094601 A1 | 4/2007 | Greenberg et al. | |
| 2007/0124370 A1 | 5/2007 | Nareddy et al. | |
| 2007/0140447 A1* | 6/2007 | Arnoff et al. | 379/88.25 |
| 2007/0165044 A1 | 7/2007 | Wells et al. | |
| 2007/0168340 A1 | 7/2007 | Mahoney et al. | |
| 2007/0220063 A1* | 9/2007 | O'Farrell et al. | 707/201 |
| 2007/0233811 A1 | 10/2007 | Rochelle et al. | |
| 2007/0288292 A1 | 12/2007 | Gauger | |
| 2008/0005235 A1 | 1/2008 | Hegde et al. | |
| 2008/0104052 A1 | 5/2008 | Ryan et al. | |
| 2008/0133501 A1* | 6/2008 | Andersen et al. | 707/5 |
| 2008/0256458 A1* | 10/2008 | Aldred et al. | 715/741 |
| 2009/0013043 A1* | 1/2009 | Tan | 709/205 |
| 2009/0100052 A1* | 4/2009 | Stern et al. | 707/6 |

OTHER PUBLICATIONS

"AquaLogic BPM 6.0: New Features Overview," BEA Systems Inc., 2008, available at <<http://edocs.bea.com/albsi/docs60/resources/ALBPM6.0_NewFeaturesOverview.pdf>>, pp. 1-26.

"Collaborative Workspaces," Local Directgov Programme, 2006, available at <<http://www.localdirect.gov.uk/assets/other/cd4-local-directgov-collaborat/>>, pp. 1-21.

"Online Workspace Tools," Webb Technologies (UK) Limited, copyright 1998-2005, available at <<http://www.collaborative-workspaces.com/workspace.htm>>, pp. 1-3.

"The Benefits of Integrating Enterprise Content Management and Team Workspaces," White Paper by Ferris Research, Report #604, Feb. 2006, available at <<http://www.messagingnews.com/_media/a/1098_604-EMC-DCE-Whitepaper-17pt_zigzag.pdf>>, pp. 1-14.

Balent, "Distance Collaboration—Tools and Strategies for EPA Employees," available at <<http://www.epa.gov/superfund/distance_pdfs/distance_collaboration_write_up4.pdf>>, Oct. 2007, pp. 1-4.

Search Report and Written Opinion for PCT/US2009/043039, international filing date May 6, 2009, mailing date Dec. 23, 2009, 12 pages.

Search Report and Written Opinion for PCT/US2009/043424, international filing date May 11, 2009, mailing date Dec. 23, 2009, 11 pages.

Pankoke-Babatz et al., "Collaborative Workspaces for Time Deferred Electronic Cooperation", Proceedings of the International ACM SIGGROUP Conference on Supporting Group Work: the Integration Challenge, Nov. 11-19, 1997, 10 pages.

Bentley et al., "Supporting Collaborative Information Sharing with the World Wide web: The BSCW Shared Workspace System", Proceedings of the 4th International WWW Conference, Issue 1, Dec. 1995, 12 pages.

Muldner et al., "An Experiment with Computer-Supported Cooperative Work: Shared Workspace", WebNet 1999, Association for the Advancment of Computing in Education (AACE), Nov. 1999, 7 pages.

Adler, et al., "Evaluating and Implementing a Collaborative Office Document System", Interacting with Computers, vol. 18, Issue 4, Jul. 2006, 18 pages.

Tsai et al., "A Document Workspace for Collaboration and Annotation Based on XML Technology", Proceedings International Symposium on Multimedia Software Engineering, Dec. 11-13, 2000, 8 pages.

Chinese Office Action, Application No. 200980131640.3, dated Feb. 22, 2012, 6 pages.

Response to Chinese Office Action, Application No. 200980131640.3, dated Jun. 19, 2012, 18 pages, including English translation of claims.

Office Action, U.S. Appl. No. 12/136,074, dated Oct. 21, 2011, 7 pages.

Amendment to Office Action, U.S. Appl. No. 12/136,074, dated Jan. 23, 2012, 14 pages.

Final Office Action, U.S. Appl. No. 12/136,074, dated Feb. 8, 2012, 10 pages.

Amendment to Final Office Action, U.S. Appl. No. 12/136,074, dated Jun. 8, 2012, 16 pages.

Office Action, U.S. Appl. No. 12/136,071, dated Oct. 26, 2011, 8 pages.

Amendment to Office Action, U.S. Appl. No. 12/136,071, dated Jan. 24, 2012, 13 pages.

Final Office Action, U.S. Appl. No. 12/136,071, dated Feb. 13, 2012, 11 pages.

Amendment to Final Office Action, U.S. Appl. No. 12/136,071, dated Jun. 13, 2012, 15 pages.

\* cited by examiner

Create a New Workspace Based on This Email

Title: [ Bake sale at the school on Saturday ]   } 604

The following items were found in your e-mail message. Select the people, documents, lists, etc. that you want to add to your workspace

People

| | | |
|---|---|---|
| [x] Joan Walker | owner ▼ | |
| [x] Anne Brown | editor ▼ | |
| [x] John Smith | editor ▼ | |
| [x] Sally Jones | editor ▼ | |
| [x] Bert White | editor ▼ | |
| [x] Sue Turner | editor ▼ | |
| [x] Tim Towson | editor ▼ | |
| [x] Bob Kerns | viewer ▼ | |
| [x] George Mann | viewer ▼ | |

} 606

Documents

[x] pricing ideas.doc
[x] schedule of events.doc

} 608

Lists

[x] tasks        Edit List

} 610

[x] Include E-mail text as part of this workspace } 612

[x] Notify me if workspace is not accessed by December 23rd 2009 by editors | Edit } 614

616    618
[ Create ]   [ Cancel ]

AUTOMATED SET-UP OF A COLLABORATIVE WORKSPACE

BACKGROUND

A collaborative workspace (henceforth "workspace") refers to functionality that allows individuals to work on a shared task in a coordinated fashion. A typical workspace defines permissions which identify a collection of members who are permitted to interact with the workspace. The permissions also define the manner in which the respective members are permitted to interact with the workspace. The workspace also commonly defines a collection of items (e.g., document items) associated with the workspace. In operation, authorized members may engage the workspace (in a manner defined by the permissions) to work on the shared items in a coordinated fashion.

An owner or administrator of a workspace creates the workspace in a manual and generally ad hoc manner. He or she performs this task by manually defining the authorized members of the workspace, together with their respective permission levels. The owner or administrator also manually identifies the items that will be part of the workspace and then associates the items with the workspace, e.g., by manually moving the items to a workspace-related store. This process is effective, but may be time-consuming and burdensome. The difficulty in setting up a workspace may discourage the would-be workspace owner or administrator from setting up a workspace in some circumstances.

SUMMARY

An approach to setting up a collaborative workspace is described. According to one illustrative implementation, the approach involves receiving a user's instruction to convert an object to a collaborative workspace. In response to this instruction, the approach creates at least aspects of the collaborative workspace in an automated manner.

According to one illustrative feature, the object that is converted corresponds to any object that is, or may be, associated with collaborative activity. One such object is a communication-related object, such as an Email message.

According to another illustrative feature, the approach establishes a group of members to be associated with the collaborative workspace, together with the permission levels associated with the members. The permission levels grant the members prescribed rights to interact with the collaborative workspace.

According to another illustrative feature, the approach establishes one or more items to be associated with the collaborative workspace. These items may include document items, data items, discussion items (e.g., Email message items), and so on.

According to another illustrative feature, the approach establishes notifications to be used to alert members of various events associated with the collaborative workspace.

According to another illustrative feature, the approach provides editing functionality which allows an authorized member to modify the automatically created collaborative workspace.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 shows an illustrative set-up user interface presentation that invites the user to confirmation, with or without revisions, various features of the workspace to be created based on the Email object of FIG. 5.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure describes an approach for setting up aspects of a collaborative workspace in an automated manner. The approach may facilitate the provisioning of a collaborative workspace, eliminating or at least reducing the manual effort involved in setting up the collaborative workspace. This may encourage a user to create a workspace in many circumstances in which the user otherwise would not. More generally, the concepts disclosed herein may address one or more of the challenges or problems previously noted, but are not limited to addressing all or any of these challenges or problems.

As used herein, the term "user" is used to describe the person who initiates the setting up of the workspace, and who may also perform initial editing of the workspace. The term "members" refers to individuals who are assigned rights to access and interact with the workspace. The person setting up the workspace (e.g., the user) will typically also be defined as a member, although need not be.

This disclosure is organized as follows. Section A describes illustrative systems for setting up a collaborative workspace. Section B describes illustrative methods performing the same function. Section C describes illustrative processing functionality that can be used to implement any aspect of the features described in Sections A and B.

A. Illustrative Systems

Figure 10:
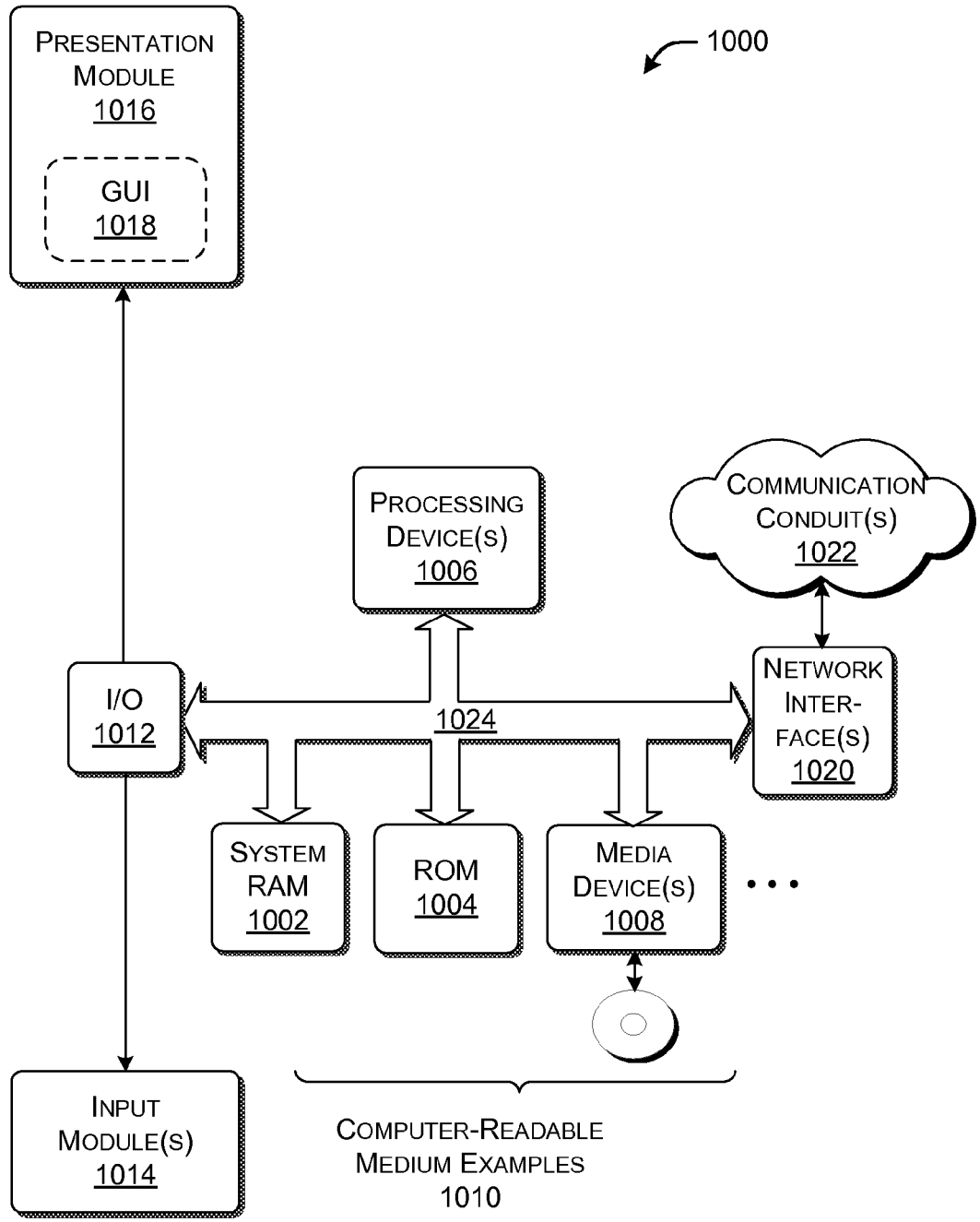
FIG. 10 shows illustrative processing functionality that can be used to implement any aspect of the features shown in the foregoing drawings.

As a preliminary matter, the various components shown in the figures can be implemented in any manner, for example, by software, hardware, firmware, manual processing operations, and so on, or any combination of these implementations. The phrase "configured to" refers to any way of providing a function, and may encompass any implementation or combination thereof (software, hardware, firmware, manual processing operations, and so on). FIG. 10, to be discussed in turn, provides additional details regarding one illustrative implementation of the functions shown in the figures.

Figure 1:
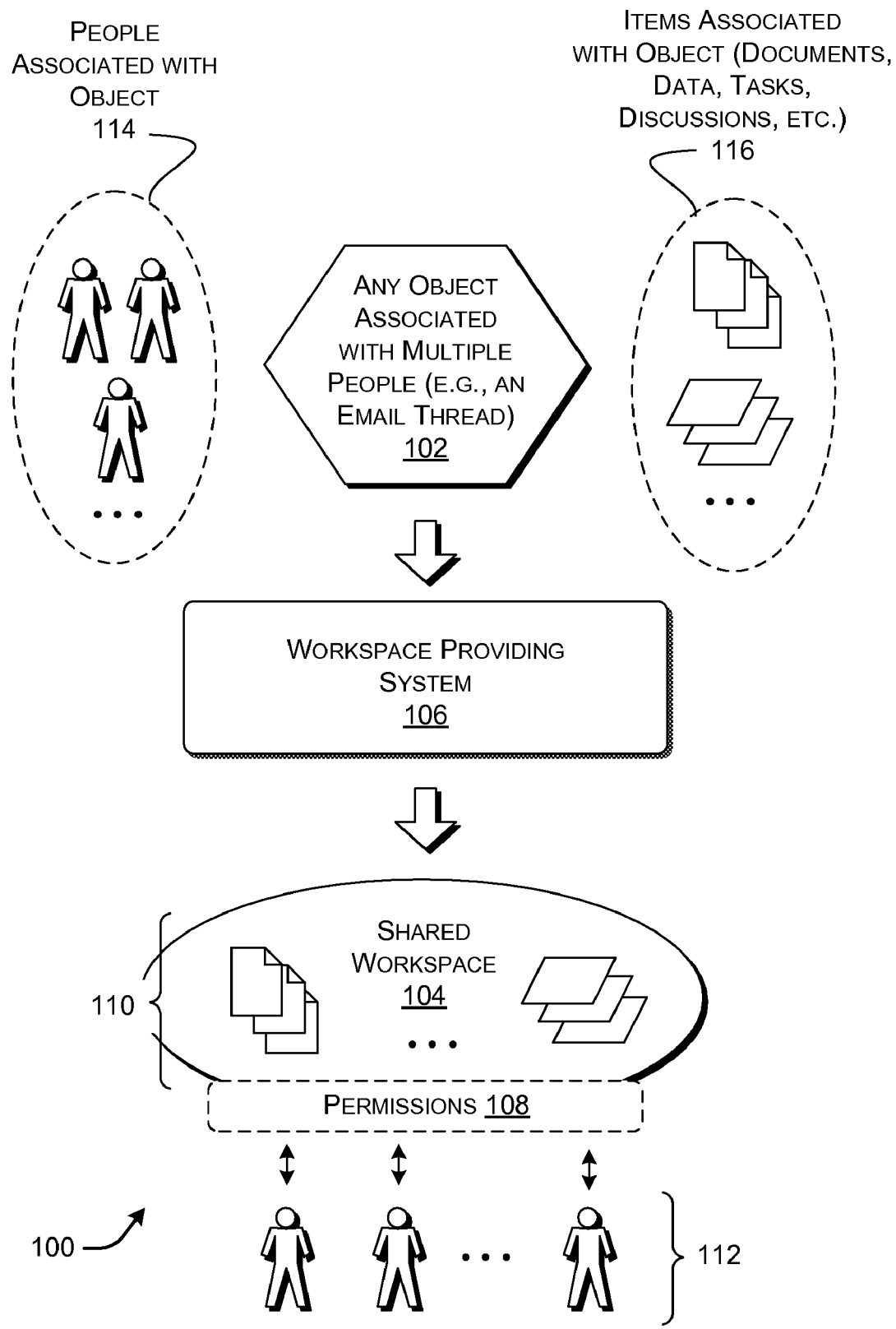
FIG. 1 shows an illustrative set-up environment which allows a user to set up aspects of a collaborative workspace ("workspace") in an automated manner.

FIG. 1 shows an overview of a set-up environment 100 in which an object 102 is converted to a collaborative workspace 104 (henceforth simply "workspace") using a workspace-providing system 106. The workspace 104 defines functionality which allows individuals to work on one or more shared tasks. The workspace 104 includes permissions 108 which define the individuals who are permitted to work on the workspace 104 (referred to as "members" herein) and the manner in which these individuals are permitted to work on the workspace 104. The workspace 104 also includes items 110 (document items, data items, discussion items, etc.) that the members are permitted to work on in a collaborative fashion. In operation, authorized members 112 may engage the workspace 104 to work on the shared items 110 in a coordinated fashion as defined by the permissions 108.

The term object is used broadly herein to refer to any kind of source item to that can be converted into a shared workspace. There is no constraint on what the object 102 may consist of, except that the object 102 is not itself already a workspace. As a general guideline, a user may wish to convert the object 102 to the workspace 104 if that object 102 is (or will be) a topic of shared interest among a group of individuals 114 (which will subsequently be defined as the members of the workspace). A user may also be encouraged to convert the object 102 to the workspace 104 if the object 102 has a plurality of items 116 associated therewith that may be effectively managed by the workspace 104. However, the object 102 need not have a plurality of such items 116 associated therewith; for instance, in one case, the object 102 may have a single item associated therewith, namely itself. The following examples will help clarify how the set-up environment 100 shown in FIG. 1 can be used.

In one illustrative use, a user may convert an Email object to the workspace 104. As will be discussed below, the resultant workspace 104 may include at least the items that are attached to the Email object. The resultant workspace 104 may include members at least corresponding to the individuals identified in the Email object.

In another illustrative use, the user may convert any other type of communication object to the workspace 104. For example, the user may decide to convert an instant messaging object to the workspace 104. The resultant workspace 104 may include at least the items that are attached to the communication object. The resultant workspace 104 may include members at least corresponding to the individuals identified in the communication object.

In another illustrative use, the user may convert a single document item or a collection of documents items (e.g., a folder of document items) to a collaborative workspace 104. In the case of a single document item, the workspace 104 may include at least a single workspace item associated with original document item. In the case of a collection of document items, the workspace 104 may include at least all of the document items in the original collection of document items. For a single document item, the workspace 104 may include at least the members who are identified by the document item itself. For a collection of document items, the workspace 104 can include at least the members who are identified in any document item in the original collection. For example, a document item may include metadata that identifies the people associated with the document item. Or the content of the document item itself may identify the people associated with the document item. For example, a memo-type document item identifies relevant people in its "To" line and "From" line, etc.

In another use, the user may convert any type of calendar object (such as a meeting invitation) to a collaborative workspace. The resultant workspace 104 may include at least the items that are attached to the calendar object or are otherwise identified by the calendar object. The resultant workspace 104 may include at least the members associated with the individuals identified in the calendar object. For example, the workspace may include at least the members who correspond to the attendees of a meeting.

The above examples are representative and non-exhaustive of the applications of the set-up environment 100.

The workspace-providing system 106 can perform the above-described conversion of the object 102 to the workspace 104 in a fully automated manner or a semi-automated manner. In any event, at least parts of the set-up process are automated. This aspect of the operation reduces the manual efforts involved in setting up the workspace 104, possibly rendering the set-up experience more satisfactory to the user and less prone to errors. Due to these features, the user may be more inclined to create workspaces (compared to the case in which the set-up operation was performed in a fully manual manner). The set-up process can be considered semi-automated (rather than fully automated) in some implementations because it may ask the user to confirm its auto-provisioning decisions. Further, the user will receive an opportunity to edit the workspace 104 generated by the set-up process.

Figure 2:
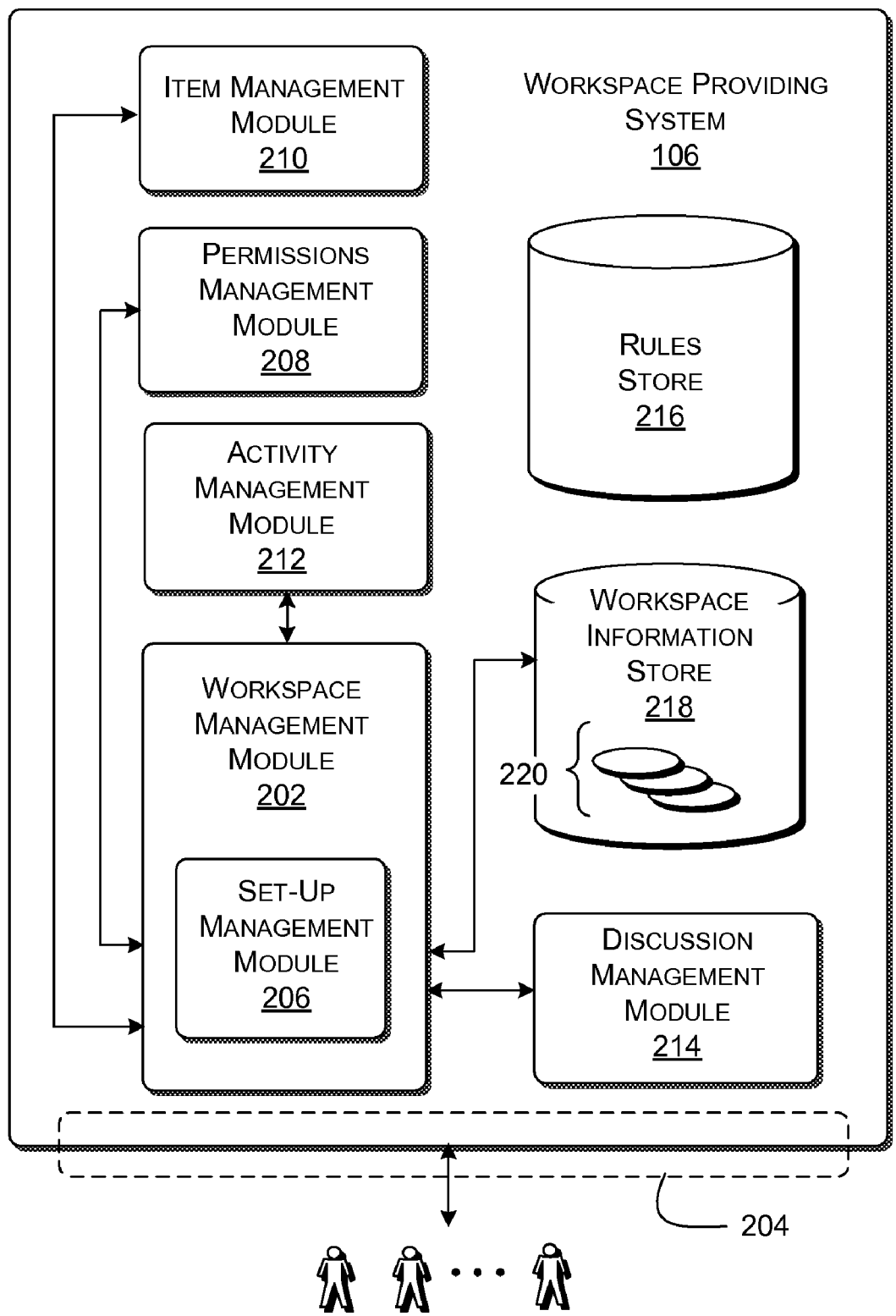
FIG. 2 shows an illustrative workspace-providing system for use in the system of FIG. 1; the workspace-providing system sets up and manages a workspace.

FIG. 2 provides additional illustrative details regarding the workspace-providing system 106. The workspace-providing system 106 creates and maintains the workspace 104. Hence, as a part thereof, the workspace-providing system 106 includes functionality for automatically (or semi-automatically) converting the object 102 to the workspace 104 in the manner summarized above. The workspace-providing system also allows the user to set up the workspace 104 in a manual manner, e.g., by manually selecting the workspace's members, permission levels, items, etc. The explanation which follows provides an overview of the workspace-providing system 106, where such an explanation is relevant to both the automated and manual modes of operation of the workspace-providing system 106. A more detailed description of the automated set-up functionality of the workspace-providing system 106 will be provided below (with respect to FIG. 3).

Figure 7:
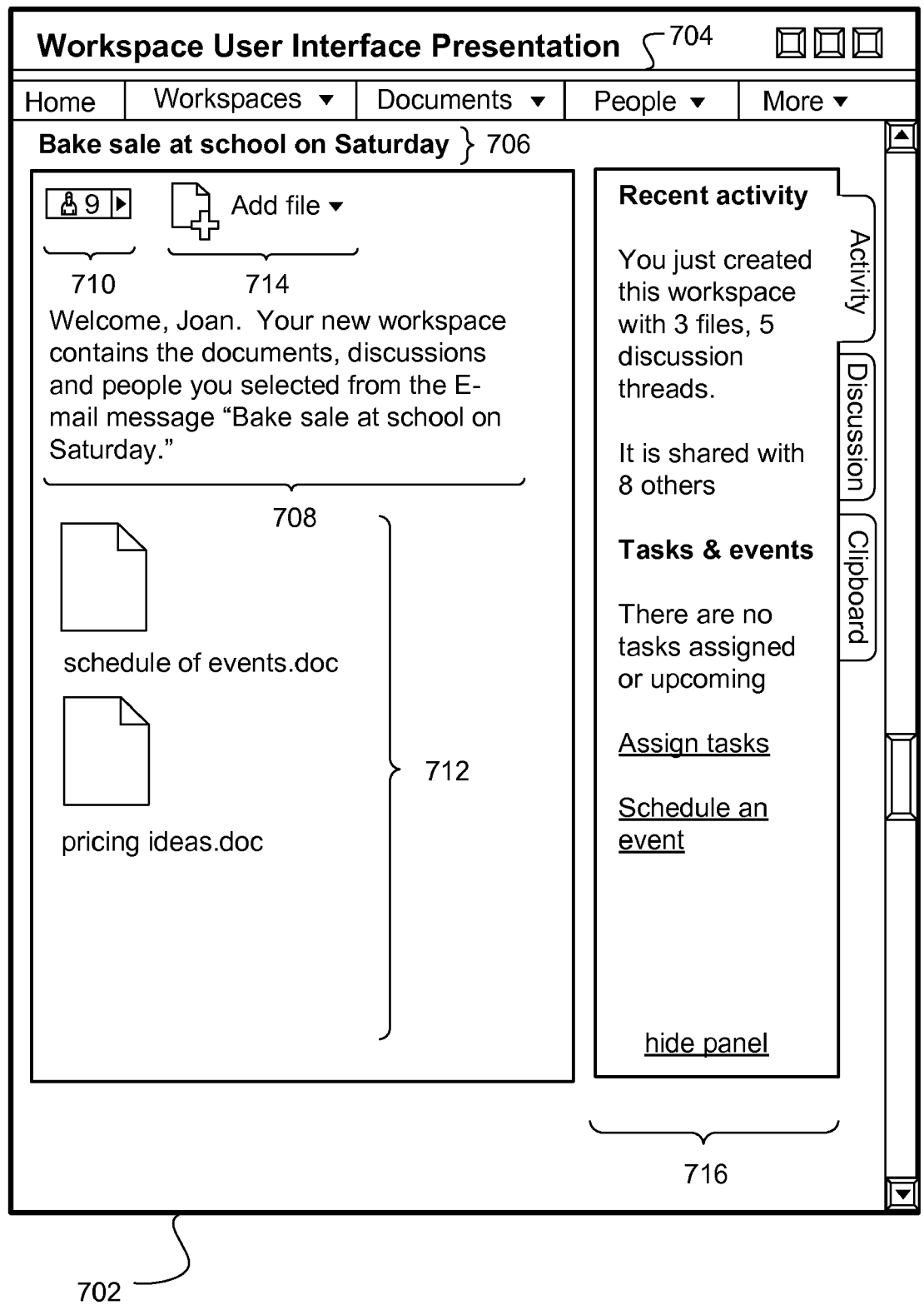
FIG. 7 shows a workspace user interface presentation created based on the selections made via the set-up user interface presentation of FIG. 6, showing a view in which an activity tab is activated.

The workspace-providing system 106 includes, or can be conceptualized to include, a collection of components. More specifically, FIG. 2 is a logical depiction of the workspace-providing system 106. In the logical depiction, the components perform different prescribed functions (to be described below). The logical functions may map to physical infrastructure in different ways. For example, the workspace-providing system 106 includes a workspace management module 202. The workspace management module 202 manages the general set-up and operation of a workspace. In doing so, the workspace management module 202 may provide a main workspace user interface (UI) presentation (as shown in FIG. 7) through which members may interact with the workspace 104. In a physical implementation, these logical functions may be performed by a combination of backend functionality and frontend functionality. For instance, a physical implementation of the workspace-providing system 106 may include an interface functionality 204 which performs the task of interfacing with members (and which thus implements all of the user interface presentations provided by the workspace-providing system 106, including the workspace UI presentation). Accordingly, reference to the workspace management module 202 can be understood as referring to whatever combination of functionality is used to perform its associated functions, however allocated among one or more components in a physical implementation. The same explanation applies to other logical components within the workspace-providing system 106.

The workspace management module 202 includes a set-up management module 206, which is the focal point of this description. The set-up management module 206 provides functionality for converting the object 102 to the workspace 104. The set-up management module 206 is described in greater detail below with respect to FIG. 3.

The workspace management module 202 also interacts with a permissions management module 208. In a manual mode of operation, the permissions management module 208 allows a user to grant individuals the right to access the workspace 104, thus assigning these individuals the status of members. The permissions management module 208 also allows the user to define the permission-level of members. Illustrative permission levels include an owner permission level, and editor permission level, and a viewer permission level. A member who is assigned an owner permission level enjoys certain administrative rights with respect to the workspace 104, such as the ability to set up, manage, and terminate the workspace 104. (In general, the specific set of rights assigned to an owner-member may be environment-specific; for instance, different companies may decide to grant owner-members different respective sets of privileges.) A member who is assigned an editor permission level has the right to make changes to the workspace items. A member who is assigned a viewer permission level has the right to view the workspace items, but does not have the right to makes changes to the workspace items.

The workspace management module 202 may also interact with an items management module 210. In a manual mode of operation, the items management module 210 allows a user to add and remove items from the workspace 104. Adding an item to a workspace 104 has the effect of "placing" the item in a shared location where it can be accessed and acted upon by members of the workspace 104 (as the permissions of the members so allow). The items can include any type of information, including document items (word processing document items, spreadsheet document items, presentation-related document items, and so on), data items, discussion items, and so on. No limitation is placed on what may constitute an item as used herein.

The workspace management module 202 may also interact with an activity management module 212. The activity management module 212 manages tasks associated with the workspace 104. For example, in a manual mode of operation, the activity management module 212 can be used by the user to set up tasks for one or more workspace members. The activity management module 212 may also provide information regarding tasks that the user is asked to performed. The activity management module 212 can also provide various notifications to members. For example, the activity management module 212 can alert a member regarding who has used (or who has failed to use) the workspace within a specified period of time.

The workspace management module 202 may also interact with a discussion management module 214. The discussion management module 214 manages communication among workspace members. For instance, the discussion management module 214 can maintain a blog-type message thread which captures the message exchange among members. The discussion management module 214 can allow a member to reply to an existing message, start a new message thread, and so on.

The workspace-providing system 106 can also include a rules store 216. The rules store 216 may provide rules which govern the behavior of various component modules of the workspace-providing system 106. For example, the rules store 216 can store rules which govern the way that the set-up management module 206 provisions the workspace 104 based on the object 102.

The enumeration of logical modules in FIG. 1 is illustrative. Other implementations can include additional modules. In addition, or alternatively, an implementation can omit one or more modules shown in FIG. 1.

The result of setting up the workspace 104 will be workspace information. The workspace information defines a linked collection of members, permissions, items, activities, and so on. A workspace information store 218 can be used to store workspace information 220 associated with the workspace 104, as well as other created workspaces (generally represented in the figure as ovals). In one case, the workspace information store 218 can store an actual copy of the items that are included in the workspace. Alternatively, or in addition, the workspace information store 218 can store reference pointers which points to various workplace items that are stored elsewhere. A workspace itself is a logical concept. That is, a workspace corresponds to a logical "space" that is defined by workspace information in conjunction with the functionality used to interact with the workspace information.

Figure 3:
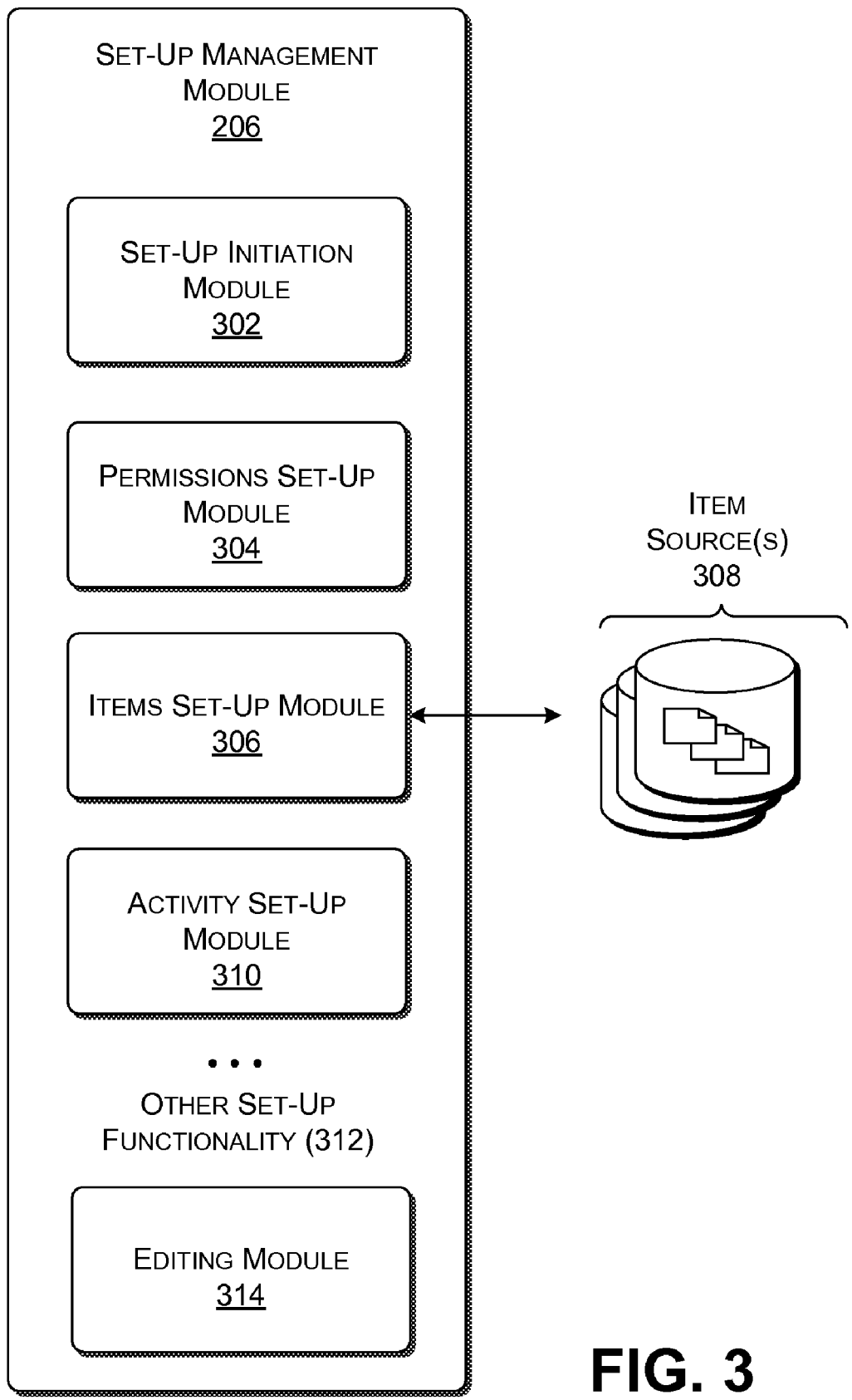
FIG. 3 shows an illustrative set-up management module for use in the workspace-providing system of FIG. 2; the set-up management module sets up the workspace.

Advancing to FIG. 3, this figure provides additional details regarding the operation of the set-up management module 206. As summarized above, the set-up management module 206 performs the role of converting any object 102 into the workspace 104. The set-up management module 206 can include (or can be conceptualized to include) a collection of component modules. These component modules represent general functions performed by the set-up management module 206. Any logical component module can be physically implemented by any one more physical components (such as any combination of backend and frontend components). Further, any component module of the set-up management module 206 can interact with other modules of the workplace providing system (of FIG. 2) to perform its ascribed functions.

A first identified module is a set-up initiation module 302. The set-up initiation module 302 allows the user to initiate the creation of the workspace 104 based on the object 102. The set-up initiation module 302 can employ different types of mechanisms for performing this function. In one case, the set-up initiation module 302 allows the user to create the workspace 104 in the context of the user's current consumption of the object 102. Assume, for example, that the user is currently reading an Email message, the Email message constituting the object 102. The interface presentation through which the user views the Email message can include a command which invites the user to convert the Email message into the workspace 104. Accordingly, in this example, the set-up initiation module 302 may potentially interact with another system (e.g., the Email system which provides the Email message to the user) to allow the user to initiate the setting up of the workspace 104. The set-up initiation module 302 can initiate this process in other ways. For example, the workspace-providing system 106 itself can include functionality which allows the user to expressly identify the object 102 to be converted into the workspace 104, e.g., by providing a user interface presentation which allows the user to enter reference information (e.g., a file name, etc.) associated with the object 102 to be converted. In this case, the user is not necessarily consuming (e.g., viewing) the object 102 at the time the user enters the instruction to initiate the conversion process. Again, still other strategies can be used to perform this initiation function.

The set-up management module 206 also includes a permissions set-up module 304. The permissions set-up module 304 may work in cooperation with the permissions management module 208 (of FIG. 2). The permissions set-up module 304 automatically (or semi-automatically) provisions the permissions of the workspace 104. The permissions set-up module 304 can perform this task in different ways depending on the type of object 102 that is being converted and other potential factors. In general, the permissions set-up module 304 may first examine the object 102 to determine whether the object 102 itself reveals an affiliation with one or more persons. The permissions set-up module 304 may then grant those persons rights to access the workspace 104 that will be created. Further, the permissions set-up module 304 can apply rules for defining workspace membership that operate independently of the object. For example, the permissions set-up module 304 may grant access rights to the workspace 104 based on the identity of the user who is initiating the set-up process. The user may specify in advance, for example, that all workspaces that she creates shall include her work colleagues as workspace members.

In addition to selecting the workspace members, the permissions set-up module 304 can define the permission level associated with each member. The permission level defines the manner in which a member is permitted to interact with the workspace 104. In one illustrative and non-limiting case, for instance, one or more members of the workspace 104 may be assigned an owner permission level, one or more members of the workspace 104 may be assigned an editor permission level, one or more members of the workspace 104 may be assigned a viewer permission level, and on (where these levels were discussed above). Once again, the permissions set-up module 304 can assign permission levels in different ways depending on the type of object 102 that is being converted and other potential factors. In one case, the permissions set-up module 304 can examine telltale information in the object 102 itself which reflects the relative status of each potential workspace member. This telltale information can be used to set the member's permission level. Further, the permissions set-up module 304 can apply rules for defining permission level that operate independently of the object. For example, a user may specify that any workspace that she sets up shall identify her, the user, as a workspace owner.

The set-up management module 206 also includes an items set-up module 306. The items set-up module 306 may work in cooperation with the items management module 210 (of FIG. 2). The items set-up module 306 automatically (or semi-automatically) provisions the items of the workspace 104. The items can include any information that is associated with the workspace 104, such as document items, discussion items, data items, and so on. The items set-up module 306 can perform this task in different ways depending on the type of object 102 that is being converted, the type of items associated with the object, and other potential factors. In general, the items set-up module 306 may first examine the object 102 to determine whether the object 102 itself reveals an affiliation with one or more items. The items set-up module 306 may then automatically associate those items with the workspace 104 that will be created. Further, the items set-up module 306 can apply rules for defining workspace items that operate independently of the object. For example, the items set-up module 306 may include certain items in the workspace 104 based on the identity of the user who is initiating the set-up process. The user may specify in advance, for example, that all workspaces that she creates shall include certain items.

In performing its function, the items set-up module 306 may interact with one or more item sources 308. The choice of which item sources 308 will be accessed depends on various factors. In one case, the items set-up module 306 can identify the items that are directly associated with the object 102, and then access the store(s) in which those items are currently maintained. Alternatively, or in addition, the items set-up module 306 can examine various item stores based on considerations that are independent of the object itself. For example, the user can configure the items set-up module 306 so that it automatically examines one or more predefined item stores to extract certain items for inclusion in the workspace 104. The item sources 308 can encompass various local stores (associated with the device that the user is using to access the workspace-providing system 106), as well as various network-accessible stores.

The term "items" as used herein encompasses other types of items besides document-type items. For example, another type of item is a discussion item. In one context, a discussion item may correspond to an individual message within an Email thread. The items set-up module 306 may include specific functionality for extracting these types of items from the original object (and/or from other potential sources). The items set-up module 306 may also include functionality for presenting these discussion items to the user in a structured format within the workspace 104 (e.g., in a blog-type format, as will be discussed).

Regarding the topic of discussion items, consider the specific scenario in which the user wishes to convert a single document item (such as a word processing document, etc.) into the workspace 104. In this case, the document item may have been originally delivered to the user in an Email message, and that Email message, in turn, may have been part of a larger discussion thread. In this case, the items set-up module 306 can investigate the origin of the document item and extract any discussion items that may be related to this item for possible inclusion in the workspace 104. This example also may implicate the permissions set-up module 304. Namely, the permissions set-up module 304 can examine the discussion thread to determine who might be appropriate candidates to suggest as members of the workspace 104.

The set-up management module 206 also includes an activity set-up module 310. The activity set-up module 310 may work in cooperation with the activity management module 212 (of FIG. 2). The activity set-up module 310 automatically (or semi-automatically) provisions assigned activities and various notifications in the workspace 104. For example, the activity set-up module 310 can automatically (or semi-automatically) assign initial tasks to workspace members. The activity set-up module 310 can also set conditions that determine when specified notifications are sent to members. For example, the activity set-up module 310 can set a condition that causes a notification to be sent to certain workspace members (such as the owner) when certain actions are performed in an allotted time span or are not performed in an allotted time span. Once again, the activity set-up module 310 can perform the above-described operations in different ways depending on the type of object 102 that is being converted and other potential factors. In general, the activity set-up module 310 may first examine the object 102 to determine whether the object 102 itself reveals telltale information which is suggestive of certain tasks that can be assigned or notifications to be defined. The activity set-up module 310 can translate this telltale information into appropriate assigned tasks and notifications within the workspace 104. Further, the activity set-up module 310 can apply rules for defining tasks and notifications that operate independently of the object. For example, the activity set-up module 310 may automatically apply certain initial tasks and set up various notifications for any workspace created by a particular user.

FIG. 3 indicates that the set-up management module 206 includes three types of component set-up modules (304, 306, and 310) described above. However, other implementations may include additional component set-up modules to automatically (or semi-automatically) provision other aspects of the workspace 104. In addition, or alternatively, other implementations can omit one or more of the component set-up modules (304, 306, and 310) described above.

For instance, FIG. 3 includes a generic label "other set-up functionality" 312 to generally represent that other set-up modules can be added to the set-up management module 206. For example, another set-up module (not shown) can be used to propose a title for the workspace. One or more other set-up modules (not shown) can be used to determine the overall arrangement of parts in the workspace 104. One or more other set-up modules (not shown) can be used to determine the "look and feel" of the workspace, and so on.

The examples to follow will provide additional explanation of the permissions set-up module 304, the items set-up module 306, and the activity set-up module 310 in the context of specific scenarios. In general, any type of component set-up module can rely on rules set forth in the rules store 216 to perform its function. The rules provided in the rules store 216 will be environment-specific. Nevertheless, the following general information regarding the rules will help clarify the nature of the rules that may be stored in the rules store 216 in one implementation.

A first general class of rules can examine the object 102 itself to extract information therefrom which may have a bearing on the provisioning of a feature of the workspace 104. In one case, such a rule may direct a component set-up module to look for specific keywords in the object 102 (such as names, Email aliases, etc.). Alternatively, or in addition, a rule may direct a component set-up module to look for information expressed within certain fields of the object 102 (such as information presented in the "To" and "From" fields of an Email message or memo document item, etc.). Or such a rule may direct a component set-up module to look at information expressed in the metadata associated with an object (if such metadata exists). These types of rules can be expressed in an "IF-THEN" format. Generically stated, one rule can specify that IF information of a certain type "W" (e.g., name-type information) is present anywhere in the object 102, THEN the workspace 104 may be provisioned by performing action "X" based on that information. Another a rule can specify that IF there is any information in field "Y" of an object, THEN the workspace 104 may be provisioned by performing action "Z" based on that information, and so on.

A second general class of rules can retrieve and apply preference information stored by any user who has the authority to configure the set-up process. Such a user may correspond to the user who initiates the provisioning of the workspace 104. The preference information may identify default instructions that determine the people ("members") who shall be granted access to the workspace 104, the permission levels to be assigned to the members, the items to be attached to the workspace 104, the tasks to be assigned to the members, the notifications to be sent on specified conditions, and so on.

A third general class of rules may examine prior actions taken by the user (or actions taken by a group of users). For example, a particular user may have a habit of attaching a particular document item to most of the workspaces that she creates. Likewise, this user may also frequently include a colleague as a workspace member with editing privileges. Based on this insight, a rule can direct a component set-up module to provision a new workspace to conform to the user's prior habits, e.g., by attaching the identified document item to the workspace 104 and by assigning the identified colleague as an editor-type member of the workspace 104.

Another class of rules can be used to apply fuzzy matching processing to the task of provisioning the workspace 104. Namely, this type of rule can assess certain characteristics of the object 102. The rule can then use any kind of fuzzy matching engine to determine workspace features that, while not exactly matching the assessed characteristics of the object 102, are related to the assessed characteristics. For example, assume that the user sends an Email message to another user with three documents relating to a specific tax-related topic. A fuzzy matching rule can analyze the nature of the topic (e.g., based on keywords associated with the topic) and extract other documents which appear to address the same topic.

The rules store 216 can store yet other types of rules. The examples provided above are merely representative. In other cases, the set-up management module 206 can incorporate more advanced tools, such as a expert system engines, neural network engines, and so on.

Finally, the set-up management module 206 can include an editing module 314. The editing module 314 can convey the results of its provisioning decisions to the user. That is, the editing module 314 can inform the user how it proposes to set up the workspace 104, e.g., informing the user what members it proposes to include in the workspace 104, what permission levels it proposes to assign to the members, what items it proposes to attach to the workspace 104, what task assignments and notifications it proposes to set up, and so on. The editing module 314 then gives the user the opportunity to modify, remove, or supplement any of the proposed selections made by the set-up management module 206. FIG. 6 illustrates one such interface that allows the user to confirm the decisions made by the set-up management module 206. The user can also modify the provisioned workspace 104 by directly acting on the workspace 104, e.g., via the workspace UI presentation (to be described with reference to FIG. 7).

Figure 4:
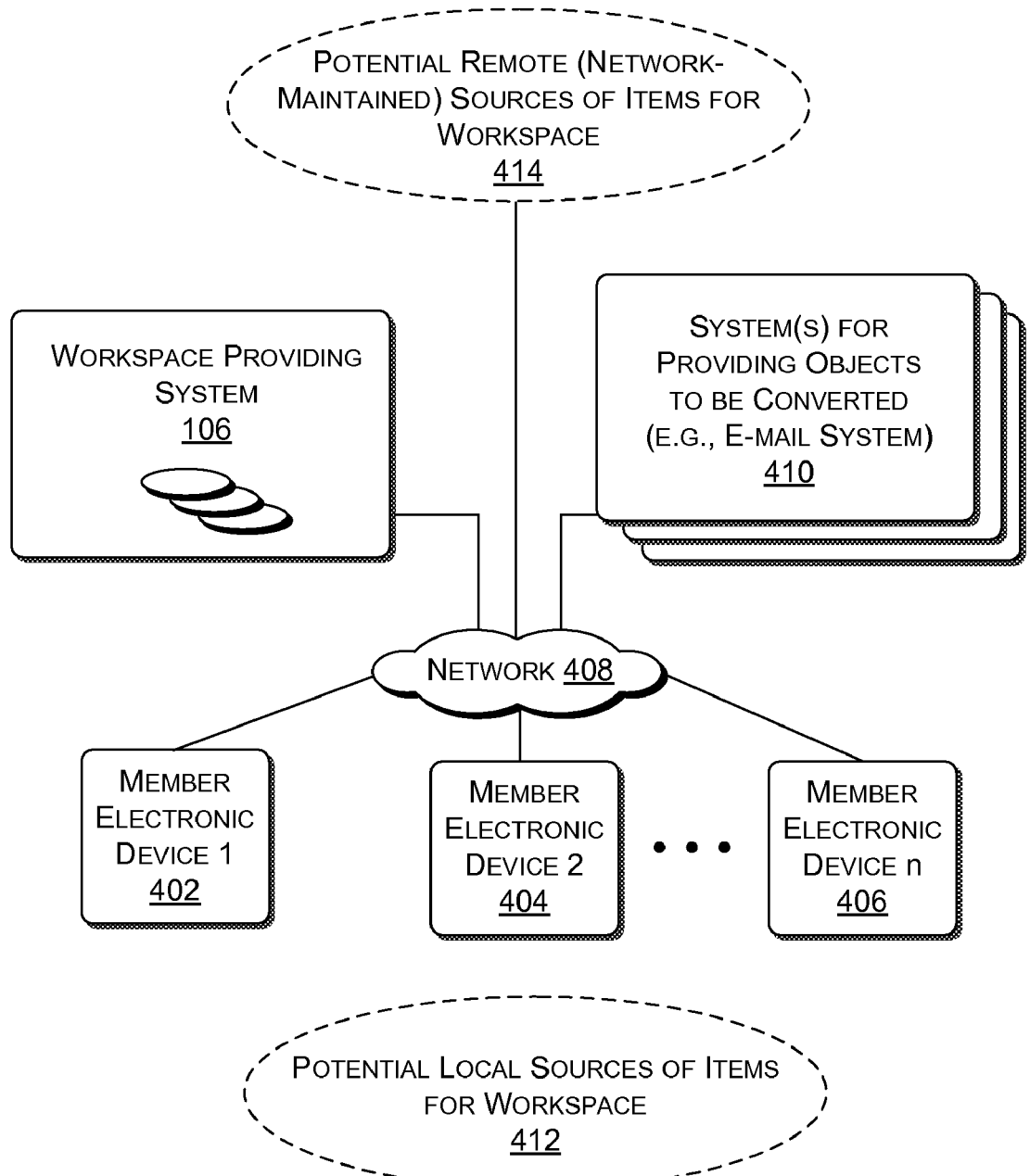
FIG. 4 shows one illustrative network-related implementation of the system of FIG. 1.

Advancing to FIG. 4, this figure shows one illustrative system 400 that can be used to implement the workspace-providing system 106. The system 400 implements the workspace-providing system 106 in a network environment. In the network environment, members may access the workspace-providing system 106 using respective member electronic devices (402, 404, . . . 406) via a network 408.

The member electronic devices (402, 404, . . . 406) can correspond to any type of data processing device or any combination of types of data processing devices. For instance, a member electronic device can be implemented by a desktop computer, a laptop computer, a personal data assistant (PDA) device, a mobile communication device, a set-top box, a game console device, and so on. Or the member electronic device can correspond to special-purpose equipment expressly designed for interacting with the workspace-providing system 106. Members may access network-accessible resources using browsing functionality (not shown) provided by the member electronic devices (402, 404, . . . 406).

The network 408 may represent any type of mechanism for allowing the electronic devices (402, 404, . . . 406) to interact with the workspace-providing system 106. The network 408 can correspond to a wide area network (such as the Internet), a local area network (LAN), a point-to-point connection, or any combination of connectivity mechanisms. The network 408 can be physically implemented using any combination of hardwired links, wireless links, name servers, gateways, routers, and so on (not shown). The network 408 can be governed by any protocol or combination of protocols.

In one scenario, the functionality and information associated with the workspace 104 are provided by the workspace-providing system 106 at some network-accessible location (or locations). This means, for instance, that all of the items associated with the workspace 104 may be stored at some network-accessible location (or locations). Alternatively, or in addition, parts of the workspace functionality and/or workspace information can be implemented locally by the member electronic devices (402, 404, . . . 406). For instance, the workspace 104 may include one or more items that are stored locally on one or more member electronic devices (402, 404, . . . 406). The workspace information provided by the workspace-providing system 106 may provide reference pointers which point to these items, rather than a copy of these items. In another alternative case, part (or all) of the workspace-providing system 106 can be implemented using peer-to-peer (P2P) infrastructure, thus eliminating or reducing the role of a centrally provided workspace-providing system 106. Still other implementations are possible.

FIG. 4 also illustrates that the workspace-providing system 106 may interact with another system 410 (or plural other systems) in converting the object 102 to the workspace 104. For example, the other system 410 may correspond to an Email system through the user may send and receive Email messages. The workspace-providing system 106 may interact with the other system 410 by allowing a user to initiate the process of setting up the workspace 104 from an interface presentation provided by the other system 410. The other system 410 may also forward information regarding the identified object (e.g., an Email message object in one case) to the workspace-providing system 106. In general, the workspace-providing system 106 and the other system 410 may be administered by the same entity or different entities.

Finally, FIG. 4 also shows two dashed-lined ovals (412, 414) to indicate that the set-up management module 206 (of FIG. 2) can draw from a variety of local sources and network-accessible sources when provisioning the workspace 104. That is, the set-up management module 206 can extract items from potential local sources of items 412 provided by the member electronic devices (402, 404, . . . 406). The set-up management module 206 an alternatively, or in addition, extract items from potential network-accessible sources 414 of items.

Figure 5:
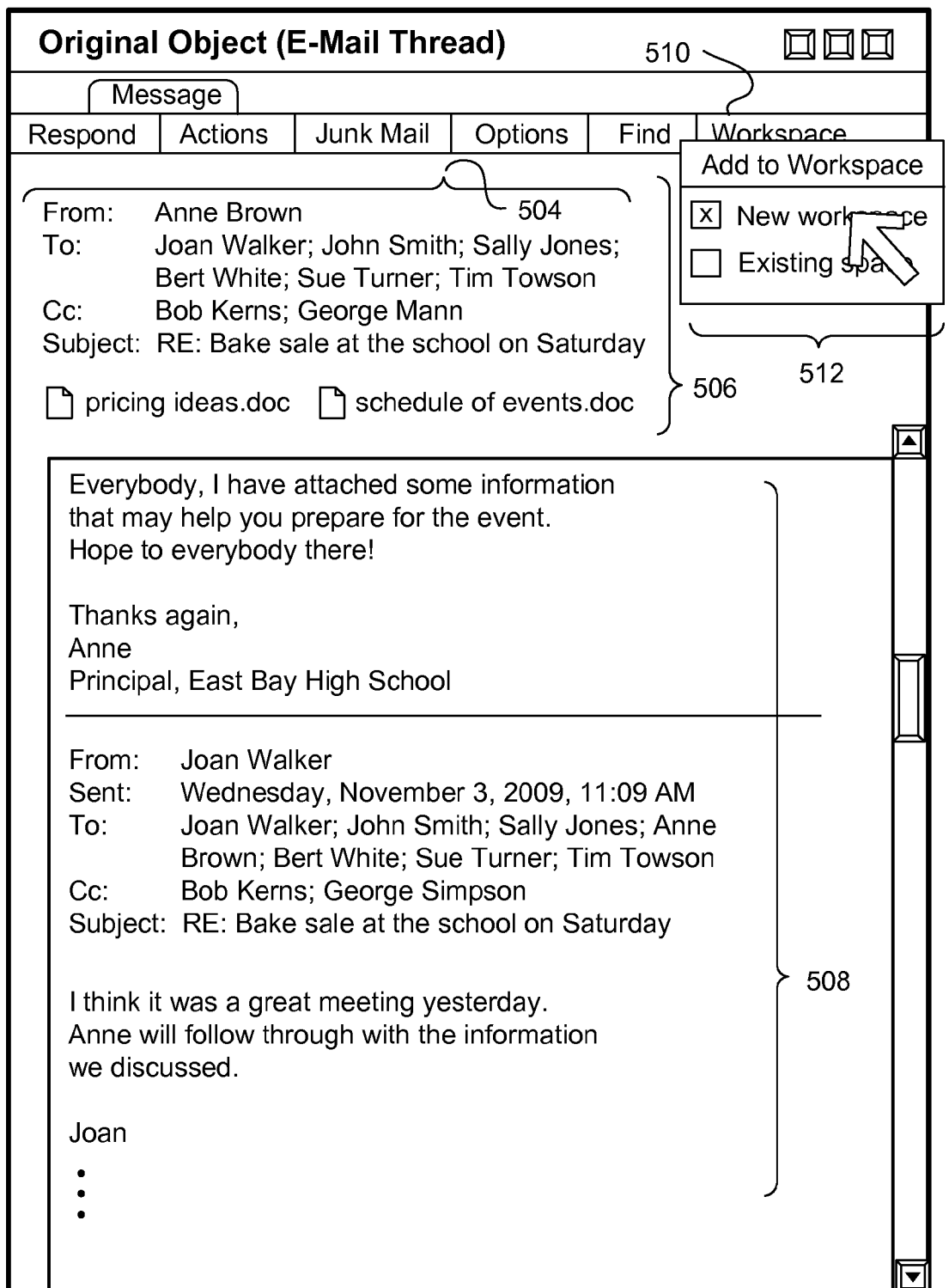
FIG. 5 shows an illustrative user interface presentation associated with an Email object, the user interface presentation including a command that allows a user to initiate the setting up of a workspace.

Advancing to FIG. 5, this figure shows an Email user interface (UI) presentation 502 that presents an Email message 504. In this example, the Email message 504 constitutes the object 102 (introduced in FIG. 1) that can be converted into the workspace 104.

The Email message 504 includes multiple components, namely, a header component 506 and a message component 508. The header component 506 provides various fields of header information. For instance, the header component can include a "From" field which identifies from whom the message has been sent. The "To" field identifies to whom the message has been sent. The "cc" field identifies who has received the message as a copy. The "Subject" field identifies the subject of the Email message. The header component 506 can also identify any attachments to the Email message 504. In this case, the Email message 504 includes two document item attachments.

The message component 508 provides the content of the Email message 504 itself. The message component 508, in turn, can include two components. A first part of the message component 508 includes the immediate content of the message sent by the sender to the recipient(s). A second part of the message component 508 may optionally include one or more inline messages in an Email thread, showing a series of Email messages which preceded the most current (topmost) message.

Assume that the user in this case is the first person on the "To" line of the Email message 504, namely, "Joan Walker." Further assume that the Email message 504 pertains to a bake sale at a local school. The Email message 504 includes a thread of Emails messages exchanged among a group of people associated with the sale, including "Anne Brown" who is the principal of the school.

Assume that the user, Joan Walker, in the course of viewing the Email message 504 decides that it is appropriate to convert this Email message to a shared workspace 104. She can go about this task in the manual manner by manually specifying the members of the workspace 104, manually specifying the permission levels of the members, manually attaching the appropriate document items, and so on. But instead, assume that the user wishes to make use of the automatic provisioning functionality provided by the set-up management module 206.

The user proceeds to automatically provision the workspace 104 by activating a workspace command 510 in the menu of the Email UI presentation 502. In one case, the workspace-providing system 106 is provided by a first entity and the Email system (which provides the Email UI presentation 502) is provided by a second entity. In this case, the workspace command 510 can be provided as a plug-in or other type of mechanism provided by the workspace-providing system 106 to the Email system, allowing the Email system to display the workspace command 510 in its menu. Still other ways of initiating the set-up processing are possible. For example, the user can separately activate the workspace-providing system 106 and instruct it to convert the Email message 504 to the workspace 104, e.g., by specifying reference information which identifies the Email message 504.

Activating the workspace command 510 causes the Email UI presentation 502 to present a selection panel 512. The selection panel 512 invites the user to specify whether the Email message 504 is to be converted to a new workspace or an existing workspace (that has already been created). Assume that the user selects the "new workspace" option. This selection invokes the set-up management module 206 to automatically or semi-automatically create the workspace 104 based on the Email message 504 and other potential factors.

The set-up management module 206 next presents a set-up UI presentation 602 to the user, as shown in FIG. 6. Namely, the proposed workspace 104 will include various features. The set-up UI presentation 602 identifies how it proposes to configure those features. Further, the set-up UI presentation 602 gives the user the opportunity to modify the proposed features in any way, including removing certain selections, adding certain new selections, and changing certain selections. Because the user is asked to verify the appropriateness of the decisions made by the set-up management module 206, the provisioning operation performed by the set-up management module 206 can be considered to be semi-automated.

A title part 604 of the set-up UI presentation 602 identifies a proposed title of the workspace 104. In this case, the proposed title is "Bake sale at the school on Saturday." The set-up management module 206 can select this title to conform to the subject line of the Email message.

A people part 606 of the set-up UI presentation 602 identifies a proposed list of members of the workspace 104. In this case, the set-up management module has selected the user "Joan Walker" as the owner of the workspace 104 because she is the person who initiated the conversion process. Other rules can be used to select the owner. For example, the person "Anne Brown" may be selected as a co-owner because she is the person who sent the Email message 504, or based on preconfigured preference information which identifies her as the principal of the school and therefore someone who is to be granted administrative privileges with respect to the workspace 104.

The people part 606 identifies a group of members with editor privileges. These people correspond to other individuals on the "To" line of the Email message 504. The people part 606 identifies another group of members with viewer privileges. These people correspond to individuals on the "cc" line of the Email message 504. These particular conversion rules are merely representative. In other cases, the set-up management module 206 can apply a rule which specifies that certain people are to be included in the workspace 104 as a default, even though they are not identified in the Email message 504 itself. In addition, or alternatively, the set-up management module 206 can examine the text of the inline Email thread to extract other names that can potentially be proposed as workspace members (even those these names do not appear in the Email header component 506).

The people part 606 includes an editing mechanism (e.g., a drop-down selection mechanism) that allows the user to change the permission level of any proposed member, or, alternatively, to entirely remove a proposed member. Although not shown, the people part 606 can also include a mechanism for adding one or more individuals who are not currently identified in the people part 606.

An item part 608 of the set-up UI presentation 602 identifies a proposed list of items that can be attached to the workspace 104. In this case, the set-up management module 206 has proposed that the two document items that were attached to the Email message 504 can be attached to the workspace 104. Again, this is merely one scenario. In another case, the set-up management module 206 can propose other items that were not expressly identified in the Email message 504. For example, the set-up management module 206 can examine the user's preference information, and based thereon, propose to attach one or more items specified as default items by the user to be included in any workspace that she creates. As in the case of the people part 606, the item part 608 can allow the user to edit the proposed item selections, e.g., by removing proposed items, adding new items, and so on.

A list part 610 of the set-up UI presentation 602 identifies proposed tasks to be assigned to members. Although no tasks are listed in this scenario, in another case, the set-up management module 206 can select tasks based on telltale information presented in the Email message 504 itself. Such telltale information may comprise any type of reference in the body of the Email message 504 to a calendar object that describes a meeting, etc. Or the set-up management module 206 can assign tasks based on other considerations (which may be independent of the characteristics of the Email message 504 itself). Again, the list part 610 includes a mechanism that allows the user to edit the proposed task selections.

A discussion part 612 of the set-up UI presentation 602 asks the user whether the text of the Email message 504 is to be included as one or more discussion-type items in the workspace. If the user selects this option, the set-up management module 206 can parse the Email message 504 into its component Email message parts and then include these component Email message parts as discussion items in the workspace 104 (in a manner which will be clarified shortly below).

A notification part 614 invites the user to select whether a notification is to be generated if certain activity is not performed in a designed time span. This type of notification is merely representative. Other implementations can allow the user to set up addition types of notifications.

Generally, the people part 606 defines the permissions of the workspace 104, the item part 608 and the discussion part 612 define the items attached to the workspace 104, and the list part 610 and the notification part 614 define activity information that is associated with the workspace 104. Other implementations can vary the type of provisioning selections provided by the set-up UI presentation 602, e.g., by omitting certain parts shown in FIG. 6, adding new parts, and so forth. Further, other implementations can vary the look and feel of the set-up UI presentation 602 in any manner.

The set-up UI presentation 602 includes a "create" command 616 which invites the user to accept the selections made in the set-up UI presentation 602, as potentially edited by the user. If the user activates this command 616, the set-up management module 206 then automatically creates the workspace 104 based on the selections in the set-up UI presentation 602. Alternatively, the user can activate a "cancel" command 618, upon which the set-up operation will be aborted and no workspace will be created.

FIG. 7 shows a workspace UI presentation 702 that acts as an interface to the workspace 104 created by the set-up management module 206. It will be appreciated that the workspace UI presentation 702 is only one type of interface presentation that can be used to access the workspace 104. Other implementations can employ respective interface presentations which vary from the workspace UI presentation 702 in any respect of combination of respects.

From a logical perspective, the workspace UI presentation 702 can be considered as being provided by the workspace management module 202 (although, as stated above, the workspace-providing system 106 may physically provide the workspace UI presentation 702 using a combination of back-end functionality and frontend interface functionality 204). The workspace UI presentation 702 serves as a main interface through which authorized members may interact with the workspace 104. In the discussion below, the person who interacts with the workspace UI presentation 702 is referred to as a user.

The workspace UI presentation 702 includes various component parts. The selection and arrangement of these parts shown in FIG. 7 is representative; other implementations can adopt different selections and arrangements of parts.

A menu part 704 of the workspace IU presentation 702 allows the user to invoke different functions provided by the workspace UI presentation 702. For instance, a "workspace" option allows the user to select a particular workspace with which to interact. A "documents" option allows the user to view items that can be added to the workspace, and then to select and add such items. A "people" option allows the user to view people who may be added to the workspace, and then to select and add such persons. The menu part 704 can include yet additional options.

In the representative case of FIG. 7, the workspace that has been created pertains to the above-noted theme of a school bake sale. A title part 706 of the workspace UI presentation 702 identifies a title associated with the workspace, namely "Bake sale at school on Saturday." This title matches the automatically-provisioned title suggested by the set-up UI presentation 602.

A message part 708 of the workspace UI presentation 702 provides a message to the user. In this case, the message is an introductory message which welcomes the user, Joan Walker, and explains that the workspace 104 which she is viewing has been set up based on the Email message 504.

A member indicator part 710 of the workspace UI presentation 702 identifies how many members are currently assigned to this workspace 104 (in this case, there are nine members). The user can activate this part 710, upon which the member indicator part 710 will reveal information that identifies the nine members. The initial members of the workspace 104 match the automatically-provisioned members suggested by the set-up UI presentation 602.

An item presentation part 712 of the workspace defines a space for displaying some of the items associated with the workspace. In one case, the item presentation part 712 represents each item using a graphical icon in combination with the item's file name. Other ways of representing items can be used. In addition, or alternatively, for instance, the item presentation part 712 can identify each item by only listing the file name of the item. The user can activate an item by clicking on the item (or activating it in some other way). The user can then view the item and edit the item (if the user has editing rights). In the example of FIG. 7, the two document items shown in the item presentation part 712 correspond to the two items attached to the Email message 504, as indicted by the set-up UI presentation 602. An "add file" part 714 of the workspace UI presentation 702 allows a user, upon activation, to add items to the workspace 104.

A side panel part 716 provides different functions associated with different tabs. FIG. 7 shows three representative tabs in the side panel part 716: an activity tab; a discussion tab; and a clipboard tab. The tabs activate panels for performing associated functions and displaying associated information. Other implementations may include additional tabs, fewer tabs, and/or different types of tabs. The user can remove and restore the side panel part 716 by activating an appropriate command, such as a "hide panel" command and a "restore panel" command, respectively.

The activity tab activates an activity panel. The activity management module 212 can implement the activity panel. The activity panel provides information regarding various tasks that are assigned to the user in connection with the workspace. The activity panel also provides functionality that allows the user to assign new tasks and schedule events. The activity panel may also provide information regarding various notifications generated by the activity management module 212. The list part 610 of the set-up UI presentation 602 does not include any selections; but if it did, these selections would govern the initial task assignments and notifications presented in the activity panel.

The discussion tab activates a discussion panel (which is not shown in FIG. 7). The discussion management module 214 can implement the discussion panel. The discussion panel provides discussion items pertaining to the workspace 104. In this case, recall that the user made a selection in discussion part 612 of the set-up UI presentation 602, instructing the set-up management module 206 to include the Email text of the Email message 504 to the workspace 104. Accordingly, the thread of discussion items in the discussion panel correspond to the thread of Email messages in the Email message 504. In one case, the discussion panel can organize the discussion items in a blog-type format, that is, with indentations illustrating the sequence of discussion items in the exchange. The discussion panel may include one or more prompts which enable the user to contribute to the discussion thread, e.g., by replying to an existing discussion item, starting a new discussion thread, and so on. The discussion items in the discussion thread constitute particular types of workspace items, as broadly defined herein.

The clipboard tab activates a clipboard panel (which is not shown in FIG. 7). The clipboard panel identifies items that have been stored in the user's clipboard. The user may add any of these items to the workspace, e.g., by moving the items from the clipboard panel to the item presentation part 712 using a drag-and-drop operation or some other technique.

Figure 8:
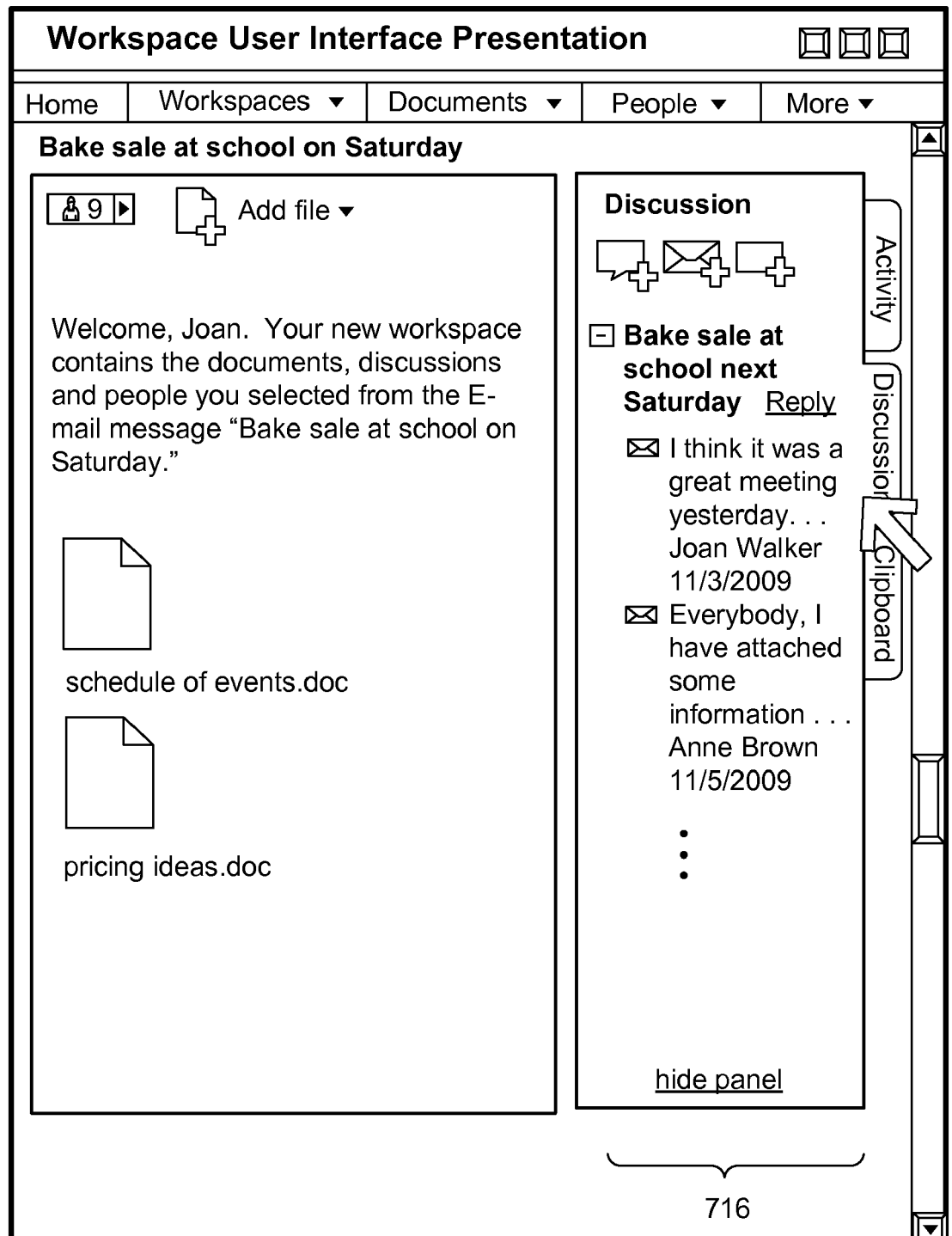
FIG. 8 shows another view of the workspace user interface presentation of FIG. 7; in this view, a discussion tab is activated.

FIG. 8 shows another depiction of the workspace UI presentation 702. This depiction is the same as that shown in FIG. 7, except that the discussion tab is activated in the side panel part 716, instead of the activity tab. Thus, FIG. 8 shows the discussion panel associated with the discussion tab. The discussion panel includes a blog-type sequence of discussion items which correspond to the thread of Email messages in the Email message 504 (as described above).

B. Illustrative Flowcharts

Figure 9:
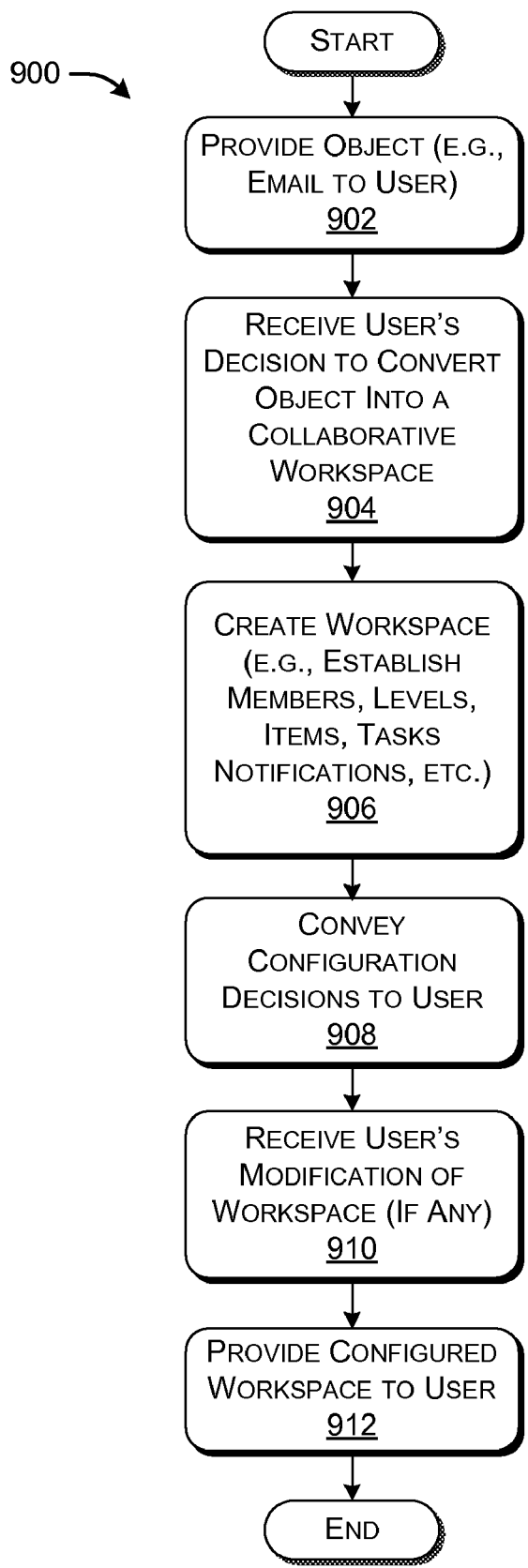
FIG. 9 is a flowchart that shows an illustrative method for creating aspects of a workspace in an automated manner.

FIG. 9 illustrates the operation of the workspace-providing system 106 in flowchart form. That is, FIG. 9 shows a procedure 900 for converting the object 102 to the workspace 104 using the workspace-providing system 106. To facilitate discussion, certain operations are described in FIG. 9 as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowchart can be implemented by software, firmware, hardware, manual processing, any combination of these implementations, and so on.

As the functions described in FIG. 9 have already been set forth above, the following explanation will serve as a summary and review of those functions.

In block 902, an object is provided to a user. In one scenario, the user receives the Email message 504 via an Email system, e.g., the "other system" 410 shown in FIG. 4.

In block 904, the workspace-providing system 106 receives the user's decision to convert the object 102 to the workspace 104. The user may enter this instruction through various mechanisms. One mechanism is the workspace command 510 shown in FIG. 5.

In block 906, the workspace-providing system 106 automatically provisions the workspace 104 based on characteristics of the object 102 and other potential factors. The operation of creating the workspace may entail establishing workspace membership, permissions, items, tasks, notifications, and so on.

In block 908, the workspace-providing system 106 optionally conveys the decisions it has made regarding the set up of the workspace 104 to the user (e.g., using the set-up UI presentation 602 shown in FIG. 6).

In block 910, the workspace-providing system 106 accepts any revisions that the user may make to the proposed workspace 104.

In block 912, the workspace-providing system 106 presents the configured workspace 104 to the user. The user may interact with the workspace 104 through the workspace UI presentation 702 shown in FIG. 7.

C. Representative Processing Functionality

FIG. 10 sets forth illustrative electrical data processing functionality or equipment 1000 (simply "processing functionality" below) that can be used to implement any aspect of functions described above. With reference to FIG. 2, for instance, the processing functionality 1000 can be used to implement the workspace-providing system 106 or any component thereof. With reference to FIG. 4, the processing functionality 1000 can also be used to implement any of the user electronic devices (402, 404, . . . 406). With reference to the same figure the processing functionality 1000 can also be used to implement any aspect of the system(s) 402 for providing objects. The processing functionality 1000 may correspond to a general purpose computing device, a special purpose computing device, or any other implementation.

The processing functionality 1000 can include volatile and non-volatile memory, such as RAM 1002 and ROM 1004, as well as one or more processing devices 1006. The processing functionality 1000 also optionally includes various media devices 1008, such as a hard disk module, an optical disk module, and so forth. The processing functionality 1000 can perform various operations identified above when the processing device(s) 1006 executes instructions that are maintained by memory (e.g., RAM 1002, ROM 1004, or elsewhere). More generally, instructions and other information can be stored on any computer-readable medium 1010, including, but not limited to, static memory storage devices, magnetic storage devices, optical storage devices, and so on. The term "computer-readable medium" also encompasses plural storage devices. The term "computer-readable medium" also encompasses signals transmitted from a first location to a second location, e.g., via wire, cable, wireless transmission, etc. The term "logic" describes instructions for performing identified tasks; for example, set-up logic corresponds to instructions for performing the tasks performed by the set-up management module 206 as described above.

The processing functionality 1000 also includes an input/output module 1012 for receiving various inputs from a user (via input modules 1014), and for providing various outputs to the user (via output modules). One particular output mechanism may include a presentation module 1016 and an associated graphical user interface (GUI) 1018. The processing functionality 1000 can also include one or more network interfaces 1020 for exchanging data with other devices via one or more communication conduits 1022. One or more communication buses 1024 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for setting up a collaborative workspace, the method being performed on electronic data processing equipment, the method comprising:

receiving a user's instruction to convert an email into a collaborative workspace;

in response to the instruction, automatically creating at least aspects of the collaborative workspace based at least in part on the email to be converted including:
based at least in part upon the email to be converted, identifying members to be associated with the collaborative workspace, to establish identified members and identifying an attachment to the email as an item to be associated with the collaborative workspace;

based at least in part upon the email to be converted, identifying permission levels of the identified members, to establish identified permission levels; and associating the identified members and the identified permission levels with the collaborative workspace; and providing the collaborative workspace thus created to the user.

2. The method of claim 1, wherein said creating of the collaborative workspace comprises:

based at least in part upon the object to be converted, identifying items to be associated with the collaborative workspace, to establish identified items; and associating the identified items with the collaborative workspace.

3. The method of claim 2, wherein the identified items comprise document items.

4. The method of claim 2, wherein the identified items comprise data items.

5. The method of claim 2, wherein the identified items comprise discussion items.

6. The method of claim 1, wherein said creating of the collaborative workspace comprises:

identifying at least one notification to be associated with the collaborative workspace, to establish at least one identified notification; and associating said at least one identified notification with the collaborative workspace.

7. The method of claim 1, further comprising:

presenting the collaborative workspace that has been created to the user;

receiving a modification by the user of the collaborative workspace; and saving the collaborative workspace as modified by the user.

8. The method of claim 1, wherein identifying members to be associated with the collaborative workspace comprises including individuals identified in the email.

9. The method of claim 1, wherein the collaborative workspace is further automatically created based upon examining prior actions taken by the user regarding creation of previous collaborative workspaces.

10. A device, comprising:

a processor comprising a set-up initiation module configured to receive a user's instruction to convert an Email to a collaborative workspace, wherein the set-up initiation module receives the user's instruction via a user interface presentation associated with the Email, wherein, in response to the instruction, a set-up management module is configured to automatically create at least aspects of the collaborative workspace based at least in part upon the Email to be converted including:
based at least in part upon the email to be converted, identify members to be associated with the collaborative workspace, to establish identified members and identify an attachment to the email as an item to be associated with the collaborative workspace;

based at least in part upon the email to be converted, identify permission levels of the identified members, to establish identified permission levels; and associate the identified members and the identified permission levels with the collaborative workspace; and provide the collaborative workspace thus created to the user.

11. The device of claim 10, wherein the user interface presentation is an Email user interface presentation through which the user is viewing the Email, wherein the set-up initiation module receives the user's instruction in response to the user activating a set-up command provided by the Email user interface presentation.

12. The device of claim 10, further comprising an items set-up module configured to identify additional items to be associated with the collaborative workspace, to establish identified additional items, and to associate the identified additional items with the collaborative workspace.

13. The device of claim 12, wherein the items set-up module interacts with a plurality of sources to identify the additional items to be associated with the collaborative workspace.

14. The device of claim 10, further comprising an activity set-up module configured to identify at least one notification to be associated with the collaborative workspace, to establish at least one identified notification, and to associate said at least one identified notification with the collaborative workspace.

15. The set-up management module of claim 10, further comprising an editing module configured to allow the user to modify the collaborative workspace that is created by the set-up management module.

16. A computer-readable storage memory for storing computer-readable instructions, the computer-readable instructions providing a set-up management module when executed by one or more processing devices, the computer-readable instructions comprising:

set-up initiation logic configured to receive a user's instruction to convert an object to a collaborative workspace, wherein, in response to the instruction, the set-up module is configured to create at least aspects of the collaborative workspace in an automated manner and wherein the object is an Email object;

permissions set-up logic configured to, based least in part upon the object to be converted, identify members to be associated with the collaborative workspace, to establish identified members, to identify permission levels of the identified members, to establish identified permission levels, and to associate the identified members and the identified permission levels with the collaborative workspace;

items set-up logic configured to, based least in part upon the object to be converted, identify items to be associated with the collaborative workspace, to establish identified items, and to associate the identified items with the collaborative workspace, the items set-up module interacting with a plurality of sources to identify the items to be associated with the collaborative workspace, the items set-up logic further configured to identify an attachment to the Email object as an item to be associated with the collaborative workspace;

activity set-up logic configured to identify at least one notification to be associated with the collaborative workspace, to establish at least one identified notification, and to associate said at least one identified notification with the collaborative workspace; and editing logic configured to allow the user to modify the collaborative workspace that is created by the set-up management module.

* * * * *